(12) United States Patent
Mirzaei et al.

(10) Patent No.: US 8,644,786 B2
(45) Date of Patent: *Feb. 4, 2014

(54) RECEIVER APPARATUS HAVING FILTERS IMPLEMENTED USING FREQUENCY TRANSLATION TECHNIQUES

(75) Inventors: Ahmad Mirzaei, Costa Mesa, CA (US); Mohyee Mikhemar, Irvine, CA (US); Hooman Darabi, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/613,624

(22) Filed: Sep. 13, 2012

(65) Prior Publication Data

US 2013/0070878 A1 Mar. 21, 2013

Related U.S. Application Data

(63) Continuation of application No. 12/461,069, filed on Jul. 30, 2009, now Pat. No. 8,285,241.

(51) Int. Cl.
*H04B 1/26* (2006.01)

(52) U.S. Cl.
USPC .......................................... 455/318; 455/323

(58) Field of Classification Search
USPC .......... 455/313, 318, 319, 323, 334, 338, 339
See application file for complete search history.

(56) References Cited

U.S. PATENT DOCUMENTS

| 5,434,541 | A | | 7/1995 | Knoedl, Jr. |
| 5,678,226 | A | | 10/1997 | Li et al. |
| 5,835,853 | A | * | 11/1998 | Enoki et al. ................. 455/180.1 |
| 6,016,170 | A | | 1/2000 | Takayama et al. |
| 6,094,236 | A | | 7/2000 | Abe et al. |
| 6,141,371 | A | | 10/2000 | Holmes et al. |

(Continued)

FOREIGN PATENT DOCUMENTS

| EP | 2 056 481 A2 | 5/2009 |
| EP | 2 270 982 A2 | 1/2011 |
| GB | 2 342 520 A | 4/2000 |

OTHER PUBLICATIONS

Darabi, "A Blocker Filtering for SAW-Less Wireless Receivers," IEEE Journal of Solid-State Circuits, vol. 42, No. 12, pp. 2766-2773, Dec. 2007.

(Continued)

*Primary Examiner* — Nhan Le
(74) *Attorney, Agent, or Firm* — Sterne, Kessler, Goldstein & Fox P.L.L.C.

(57) ABSTRACT

A method and apparatus is disclosed to effectively frequency translate a filter characterized as a low quality factor (Q) filter, corresponding to a baseband frequency of approximately zero Hertz or to an intermediate frequency (IF), to a filter characterized as a high Q filter at frequencies greater than the baseband frequency or the IF. A downconversion mixer frequency translates a communication signal to the baseband frequency or the IF using a first local oscillator signal to provide a downconverted communication signal. A filter corresponding to the baseband frequency or the IF filters the downconverted communication signal to provide a filtered communication signal. An upconversion mixer frequency translates a communication signal using a second local oscillator signal. The frequency translation by the upconversion mixer, in effect, translates the filter characterization from the low Q filter to the high Q filter at frequencies greater than the baseband frequency or the IF.

20 Claims, 10 Drawing Sheets

(56) References Cited

U.S. PATENT DOCUMENTS

| | | | |
|---|---|---|---|
| 6,512,408 B2 | 1/2003 | Lee et al. | |
| 6,625,436 B1 | 9/2003 | Tolson et al. | |
| 6,954,625 B2 | 10/2005 | Cowley | |
| 7,046,979 B2 * | 5/2006 | Lee | 455/302 |
| 7,248,844 B2 | 7/2007 | Rofougaran | |
| 7,555,273 B2 | 6/2009 | Morche | |
| 7,636,559 B2 * | 12/2009 | Magnusen et al. | 455/266 |
| 7,764,942 B2 | 7/2010 | Bayruns | |
| 7,809,349 B1 | 10/2010 | Granger-Jones et al. | |
| 7,894,790 B2 * | 2/2011 | Gomez et al. | 455/314 |
| 7,933,627 B2 * | 4/2011 | Tso | 455/552.1 |
| 8,285,241 B2 * | 10/2012 | Mirzaei et al. | 455/318 |
| 8,340,219 B2 * | 12/2012 | Lee et al. | 375/316 |
| 2003/0148748 A1 | 8/2003 | Shah | |
| 2003/0186669 A1 | 10/2003 | Yamawaki et al. | |
| 2004/0110482 A1 | 6/2004 | Chung | |
| 2005/0024544 A1 | 2/2005 | Waight et al. | |
| 2007/0121945 A1 | 5/2007 | Han et al. | |
| 2007/0264943 A1 | 11/2007 | Darabi | |
| 2007/0287403 A1 | 12/2007 | Sjoland | |
| 2008/0014896 A1 | 1/2008 | Zhuo et al. | |
| 2008/0083967 A1 | 4/2008 | Nakatani et al. | |
| 2008/0175307 A1 | 7/2008 | Brunn et al. | |
| 2008/0214135 A1 | 9/2008 | Muhammad | |
| 2009/0061805 A1 | 3/2009 | Kim et al. | |
| 2009/0133252 A1 | 5/2009 | Drapkin et al. | |
| 2009/0191833 A1 | 7/2009 | Kaczman et al. | |
| 2010/0255791 A1 | 10/2010 | Vazny et al. | |
| 2010/0267354 A1 | 10/2010 | Mirzaei et al. | |
| 2010/0317308 A1 | 12/2010 | Mirzaei et al. | |
| 2010/0317311 A1 | 12/2010 | Mirzaei et al. | |
| 2011/0003569 A1 | 1/2011 | Mirzaei et al. | |
| 2011/0003572 A1 | 1/2011 | Mirzaei et al. | |
| 2011/0028115 A1 | 2/2011 | Mirzaei et al. | |
| 2011/0092176 A1 | 4/2011 | Molnar et al. | |

OTHER PUBLICATIONS

Darabi, "A Blocker Filtering Technique for Wireless Receivers," International Solid-State Circuits Conference 2007, Session 4, RF Building Blocks, 4.4, pp. 84-86, Feb. 12, 2007.

Mirzaei, et al., "A Low-Power WCDMA Transmitter With an Integrated Notch Filter," IEEE Journal of Solid-State Circuits, vol. 43, No. 12, pp. 2868-2881, Dec. 2008.

Ayazian, S., et al., "Feedforward Interference Cancellation in Radio Receiver Front-Ends," *IEEE Transactions on Circuits and Systems II: Express Briefs,* 54(10): 902-906 (Oct. 2007).

European Search Report for EP Application No. EP 10007923.5-1852, Munich, Germany, mailed on Apr. 19, 2013.

\* cited by examiner

RECEIVER APPARATUS HAVING FILTERS IMPLEMENTED USING FREQUENCY TRANSLATION TECHNIQUES

CROSS-REFERENCE TO RELATED APPLICATIONS

This patent application claims the benefit of U.S. patent application Ser. No. 12/461,069, filed Jul. 30, 2009, now U.S. Pat. No. 8,285,241, which is incorporated herein by reference in its entirety.

FIELD OF THE INVENTION

This application relates generally to filters and, more specifically, to high quality factor (Q) filters.

BACKGROUND

There exist two commonly implemented front-end architectures in radio frequency (RF) receiver design; namely, the homodyne architecture and the heterodyne architecture. The homodyne architecture down-converts a desired channel directly from RF to substantially zero Hertz, referred to as baseband, or a low intermediate frequency (IF). The heterodyne architecture down-converts a desired channel to one or more intermediate frequencies (IF) before down-conversion to baseband. In general, each of these front-end architectures typically employ an antenna to receive an RF signal, a band-pass filter to suppress out-of-band interferers in the received RF signal, a low noise amplifier (LNA) to provide gain to the filtered RF signal, and one or more down-conversion stages.

Each component in a receiver front-end contributes noise to the overall system. The noise of a component can be characterized by its noise figure (NF), which is given by the ratio of the SNR at the input of the component to the SNR at the output of the component:

$$NF_{COMPONENT} = \frac{SNR_{IN}}{SNR_{OUT}}. \quad (1)$$

The noise of the overall receiver front-end increases from input to output as noise from successive components compound. In general, the overall noise figure of the receiver front-end is proportional to the sum of each component's noise figure divided by the cascaded gain of preceding components and is given by:

$$NF_{TOTAL} = NF_1 + \frac{NF_{2-1}-1}{A_1} + \frac{NF_{2-1}-1}{\prod_{i=1}^{2} A_i} + \ldots + \frac{NF_{n-1}-1}{\prod_{i=1}^{n} A_i}, \quad (2)$$

where $NF_n$ and $A_n$ represent the noise figure and gain of the $n^{th}$ component in the receiver front-end, respectively. The above equation reveals that the noise figure $(NF_1)$ and gain $(A_1)$ of the first gain component can have a dominant effect on the overall noise figure of the receiver front-end, since the noise contributed by each successive component is diminished by the cascaded gain of the components that precede it.

To provide adequate sensitivity, therefore, it is important to keep the noise figure $(NF_1)$ low and the gain $(A_1)$ high of the first gain component in the receiver front-end. The sensitivity of the receiver front-end determines the minimum signal level that can be detected and is limited by the overall noise figure of the receiver front-end. Thus, in typical receiver designs the first gain component in the front-end is an LNA, which can provide high gain, while contributing low noise to the overall RF receiver.

LNAs provide relatively linear gain for small signal inputs. However, for sufficiently large input signals, LNAs can exhibit non-linear behavior in the form of gain compression; that is, for sufficiently large input signals, the gain of the LNA approaches zero. LNA gain compression is a common issue confronted in RF receiver design, since large out-of-band interferers referred to as blockers can accompany a comparatively weak desired signal in a received RF signal. For example, in the Global System for Mobile Communications (GSM) standard, a desired signal 3 dB above sensitivity (−102 dBm) can be accompanied by a 0 dBm blocker as close as 80 MHz away. If these large out-of-band interferers are not attenuated prior to reaching the LNA, they can reduce the average gain of the LNA. As noted above, a reduction in the gain provided by the LNA leads to an increase in the noise figure of the receiver front-end and a corresponding degradation in sensitivity.

Therefore, a band-pass filter is conventionally employed in the receiver front-end, before the LNA, to attenuate large out-of-band interferers. These filters are typically mechanically-resonant devices, such as surface acoustic wave (SAW) filters, that provide a high quality factor (Q) required by many of today's communication standards (e.g., GSM). The Q-factor of a tuned circuit, such as a band-pass filter, is the ratio of its resonant frequency (or center frequency) to its 3 dB frequency bandwidth. SAW filters are generally not amenable to monolithic integration on a semiconductor substrate with the RF receiver. However, SAW filters remain conventional in RF receiver design because of the limited Q-factor of silicon-based inductors.

Although SAW filters can provide excellent attenuation of large out-of-band interferers and accurate pass-band location, they have several associated disadvantages. First, these filters have an approximate insertion loss of 1-2 dB in their pass-band. This directly adds to the noise figure and degrades sensitivity of the RF receiver. Second, these filters invariably add cost and circuit board area, especially in multi-band applications where several of these filters can be required.

Therefore, there exists a need for an apparatus that provides adequate attenuation of large out-of-band interferers on a semiconductor substrate, while accommodating wideband applications

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

Figure 4:
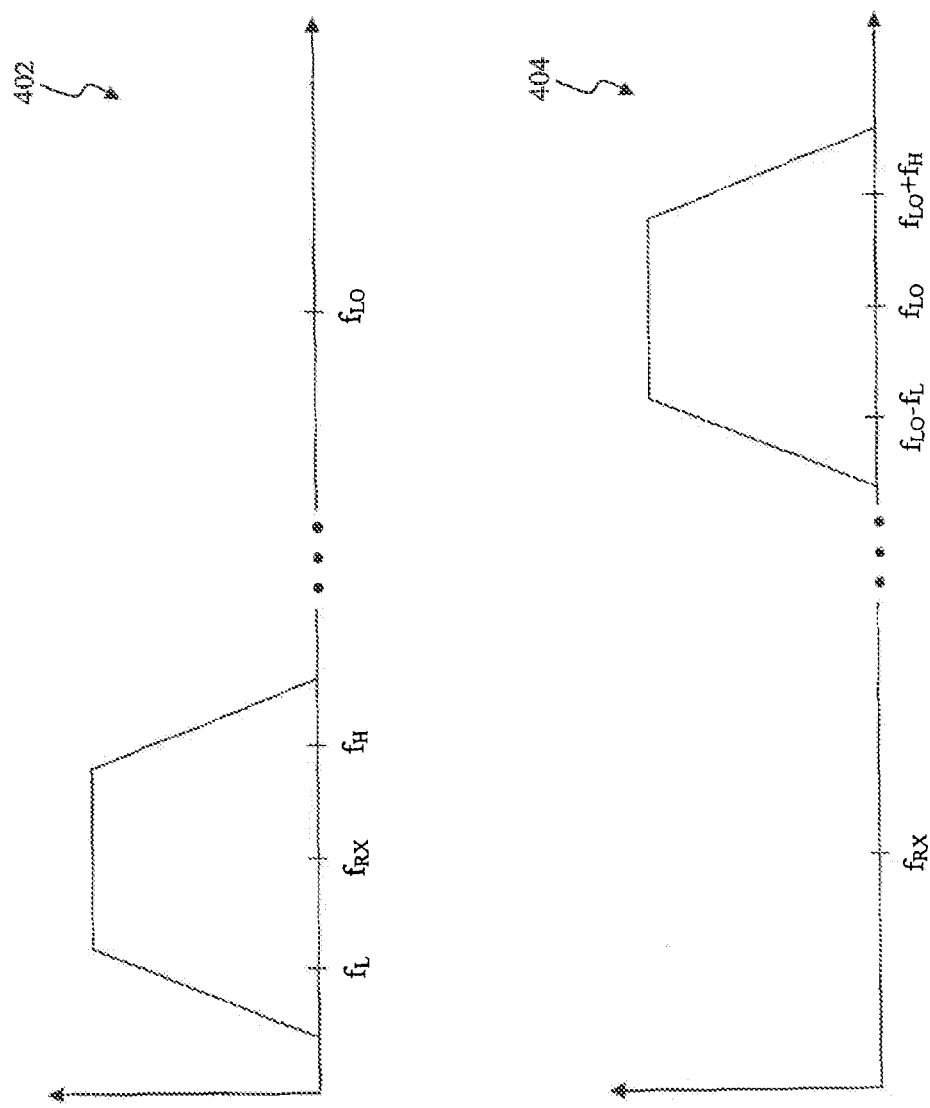

FIG. 4 graphically illustrates a frequency translation of a filter module used in the communications receiver according to an exemplary embodiment of the present invention.

Figure 5:
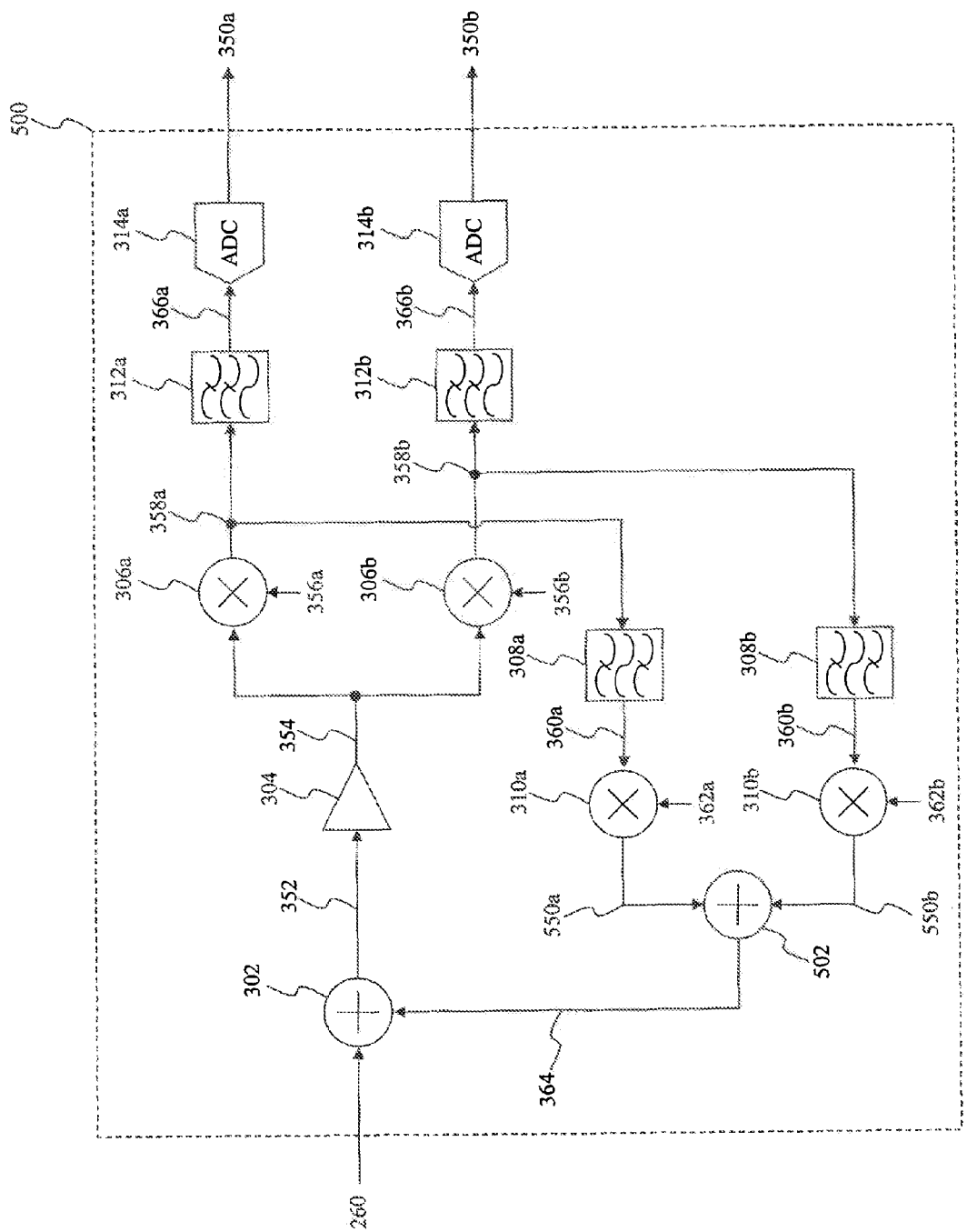

FIG. 5 illustrates a second block diagram of a communications receiver used in the communications transceiver according to a second exemplary embodiment of the present invention.

Figure 6A:
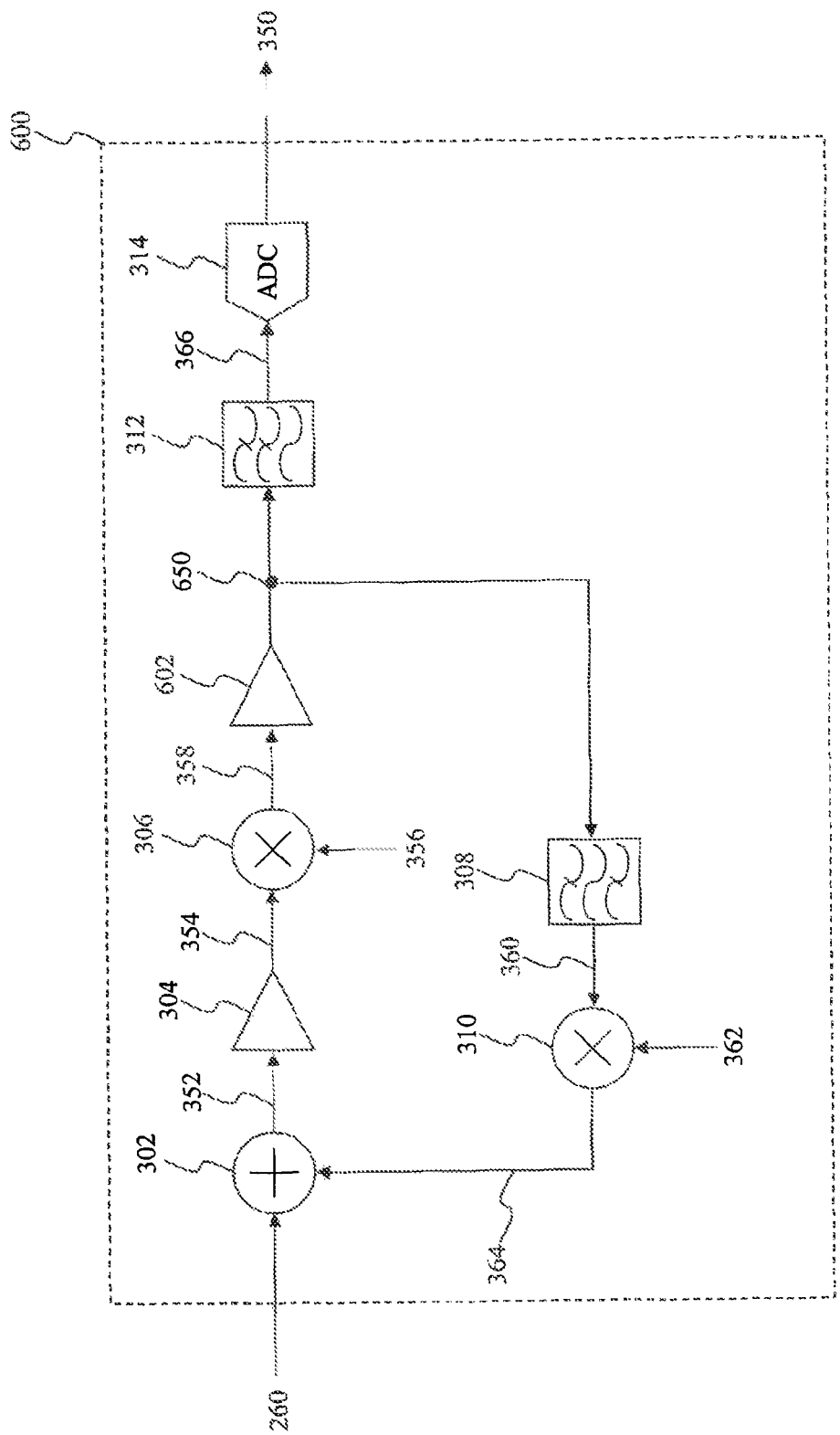

FIG. 6A illustrates a third block diagram of a communications receiver used in the communications transceiver according to a third exemplary embodiment of the present invention.

Figure 6B:
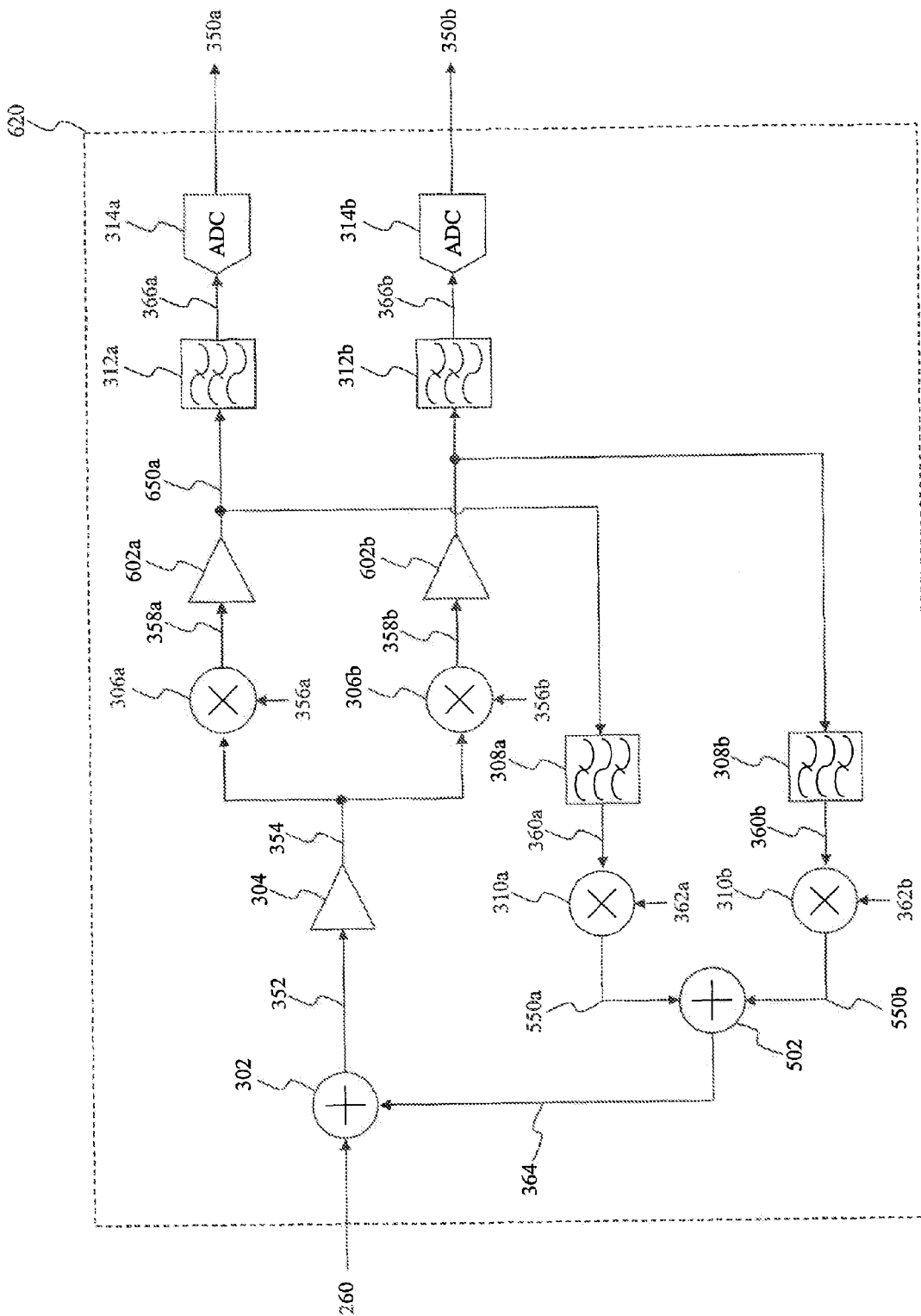

FIG. 6B illustrates a fourth block diagram of a communications receiver used in the communications transceiver according to a fourth exemplary embodiment of the present invention.

Figure 7:
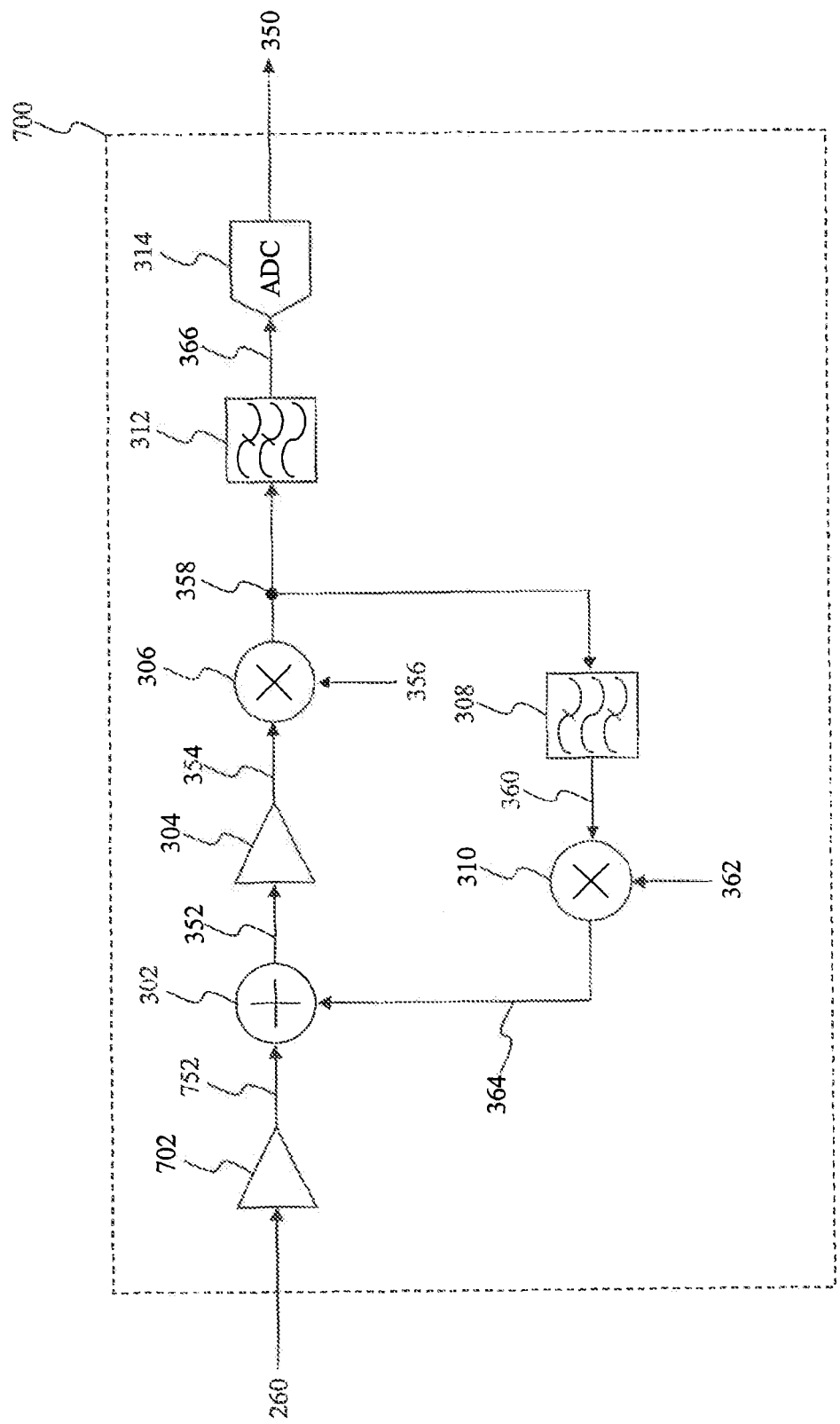

FIG. 7 illustrates a fifth block diagram of a communications receiver used in the communications transceiver according to a fifth exemplary embodiment of the present invention.

Figure 8:
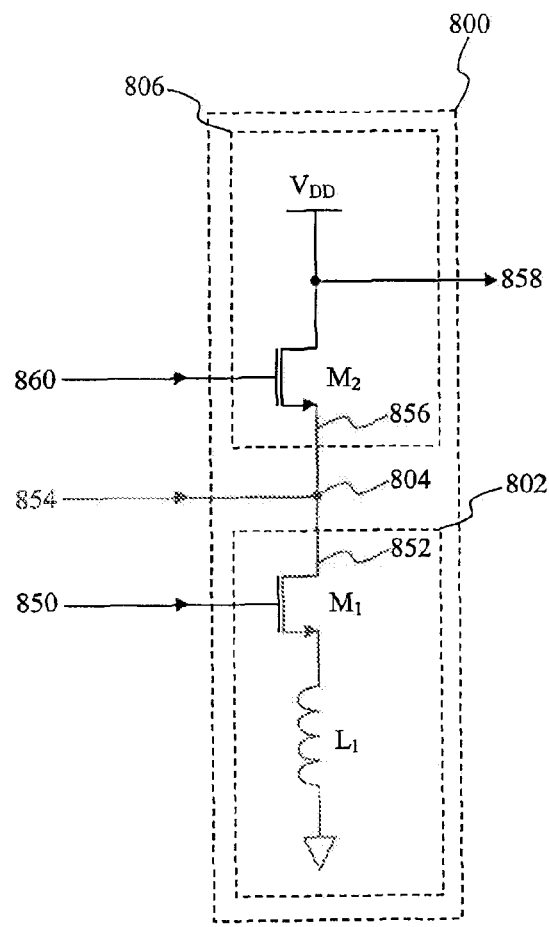

FIG. 8 illustrates a block diagram of an amplifier module used in the communications receiver according to an exemplary embodiment of the present invention.

Figure 9:
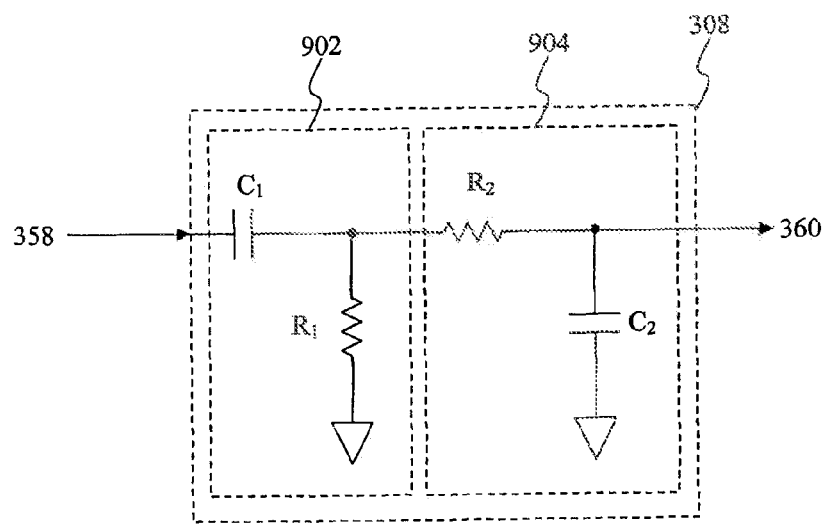

FIG. 9 illustrates a block diagram of a filter module used in the communications receiver according to an exemplary embodiment of the present invention.

Figure 10:
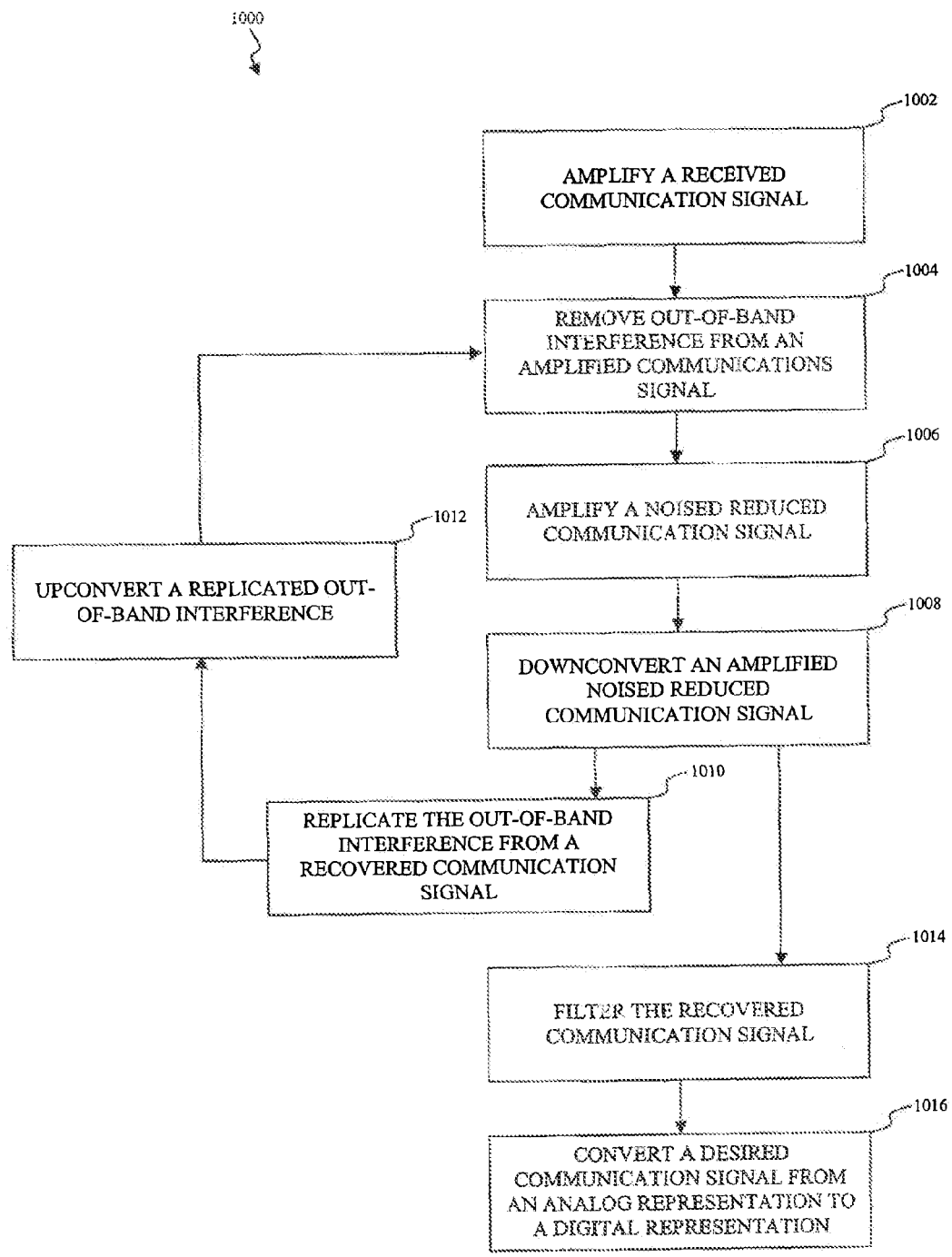

FIG. 10 is a flowchart of exemplary operational steps of the communications receiver used in the communications transceiver according to an exemplary embodiment of the present invention.

The present invention will be described with reference to the accompanying drawings. The drawing in which an element first appears is typically indicated by the leftmost digit(s) in the corresponding reference number.

DETAILED DESCRIPTION OF THE INVENTION

The following Detailed Description refers to accompanying drawings to illustrate exemplary embodiments consistent with the invention. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to effect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the following claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the present invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Communications Environment

Figure 1:
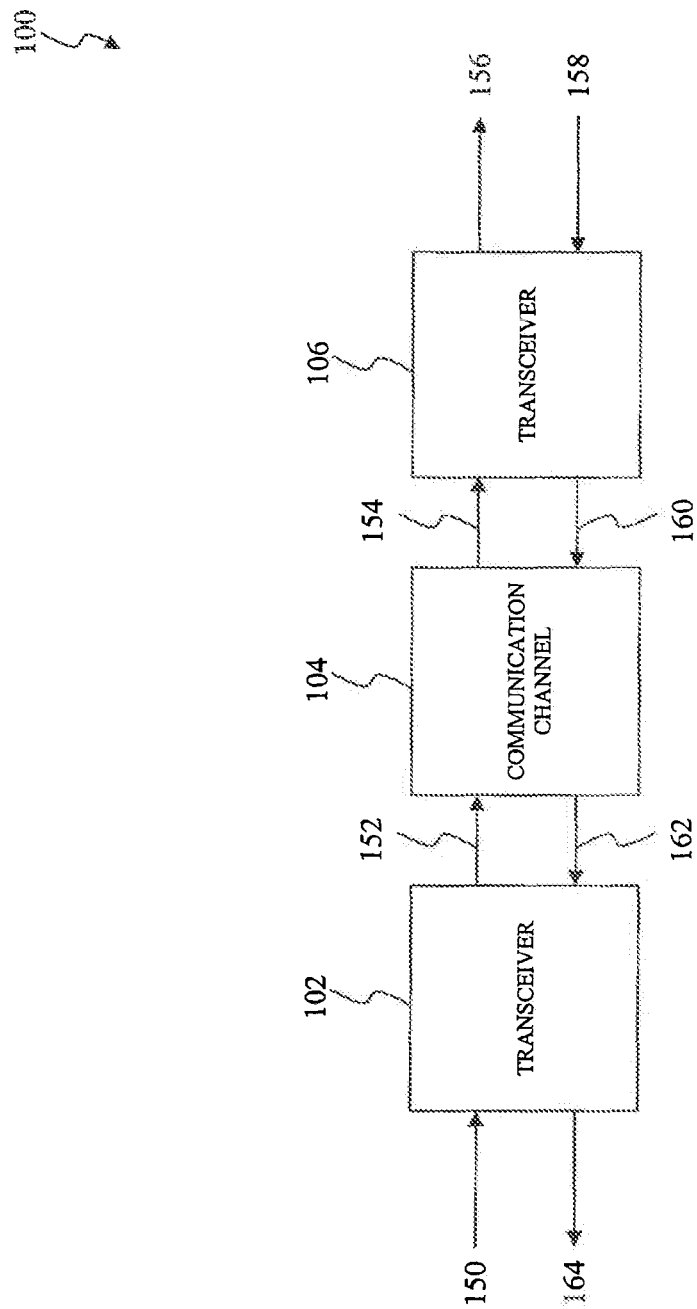
FIG. 1 illustrates a block diagram of a communications environment according to an exemplary embodiment of the present invention.

FIG. 1 illustrates a block diagram of a communications environment according to an exemplary embodiment of the present invention. The communications environment 100 includes a first communications transceiver 102 to transmit one or more first information signals, denoted as a first information signal 150, as received from one or more first transceiver user devices to a second communications transceiver 106 via a communications channel 104. The one or more first transceiver user devices may include, but are not limited to, personal computers, data terminal equipment, telephony devices, broadband media players, personal digital assistants, software applications, or any other device capable of transmitting or receiving data. The first communications transceiver 102 provides a first transmitted communications signal 152 based upon the first information signal 150.

The first transmitted communications signal 152 passes through the communications channel 104 to provide a first received communications signal 154. The communications channel 104 may include, but is not limited to, a microwave radio link, a satellite channel, a fiber optic cable, a hybrid fiber optic cable system, or a copper cable to provide some examples. The communications channel 104 contains a propagation medium that the first transmitted communications signal 152 passes through before reception by the communications receiver 106. The propagation medium of the communications channel introduces interference and/or distortion into the first transmitted communications signal 152 causing a first received communications signal 154 to differ from the first transmitted communications signal 152. For example, the communications channel 104 may introduce interference and/or distortion resulting from undesirable signals, referred to as interferers, into the first transmitted communications signal 152. This interference may be inclusive within a bandwidth occupied by the first transmitted communications signal 152, referred to as in band interference, and/or exclusive within the bandwidth occupied by the first transmitted communications signal 152, referred to as out-of-band interference.

The second communications transceiver 106 receives the first received communications signal 154 as it passes through the communications channel 104 to provide one or more first recovered information signals, denoted as a first recovered information signal 156, for one or more second transceiver user devices. The one or more second transceiver user devices may include, but are not limited to, personal computers, data terminal equipment, telephony devices, broadband media players, personal digital assistants, software applications, or any other device capable of transmitting or receiving data.

The second communications transceiver 106 transmits one or more second information signals, denoted as a second information signal 158, as received from the one or more second transceiver user devices to the first communications transceiver 102 via the communications channel 104. The second communications transceiver 106 provides a second transmitted communications signal 160 based upon the second information signal 158.

The second transmitted communications signal 160 passes through the communications channel 104 to provide a second received communications signal 162. The first communications transceiver 102 receives the second received communications signal 162 as it passes through the communications channel 104 to provide one or more second recovered information signals, denoted as a second recovered information signal 164, for the one or more first transceiver user devices.

Communications Transceiver

Figure 2:
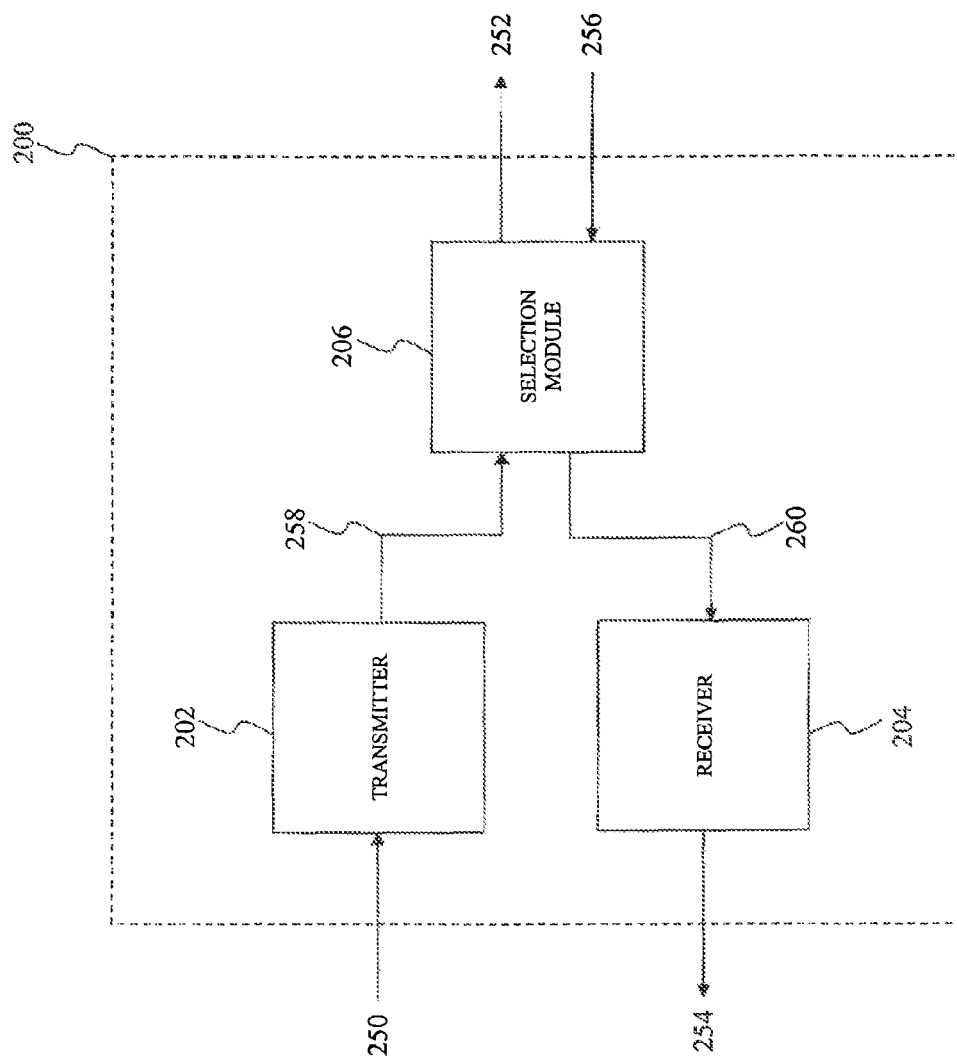
FIG. 2 illustrates a block diagram of a communications transceiver used in the communications environment according to an exemplary embodiment of the present invention.

FIG. 2 illustrates a block diagram of a communications transceiver used in the communications environment according to an exemplary embodiment of the present invention. A communications transceiver 200 provides a presented communications signal 252 based upon an information signal 250 and/or a recovered information signal 254 based upon an observed communications signal 256. The communications transceiver 200 may represent an exemplary embodiment of the first communications transceiver 102 and/or the second communications transceiver 106 as described above. Likewise, the presented communications signal 252 may represent an exemplary embodiment of the first transmitted communications signal 152 and/or the second transmitted communications signal 156 as described above. Similarly, the observed communications signal 256 may represent an exemplary embodiment of the first received communications signal 154 and/or the second received communications signal 162 as described above.

The communications transceiver 200 includes a communications transmitter 202, a communications receiver 204, and a selection module 206. The communications transmitter 202 provides a transmitted communications signal 258 based upon the information signal 250. The functionality of the communications transmitter 202 may include filtering of, encoding of, modulating of, and/or error correction of the information signal 250. However these examples are not limiting, those skilled in the relevant art(s) may implement the communications transmitter 202 to include any other suitable function(s) without departing from the spirit and scope of the present invention.

The communications receiver 204 provides recovered information signal 254 based upon a received communications signal 260. The functionality of the communications receiver 204 may include filtering of, decoding of, demodulating of and/or error correction of the received communications signal 260. However these examples are not limiting, those skilled in the relevant art(s) may implement the communications receiver 204 to include any other suitable function(s) without departing from the spirit and scope of the present invention.

The selection module 206 provides the transmitted communications signal 258 as the presented communications signal 252 to the communications channel 104 via one or more antennas, one or more copper cables, one or more fiber optic cables, and/or any other suitable means that will be apparent to those skilled in the relevant art(s). Likewise, the selection module 206 provides the observed communications signal 256 as the received communications signal 260 from the communications channel 104 via the one or more antennas, the one or more copper cables, the one or more fiber optic cables, and/or the any other suitable means that will be apparent to those skilled in the relevant art(s). The selection module 206 may present the presented communications signal 252 using a similar device that is used to observe the observed communications signal 256 or one or more dissimilar devices. For example, the selection module 206 may present the presented communications signal 252 to a single antenna and observe the observed communications signal 256 from the single antenna. As another example, the selection module 206 may preserve the presented communications signal 252 to a single antenna and observe the observed communications signal 256 from one or more copper cables.

The selection module 206 may be configured to operate in a half-duplex mode of operation or a full-duplex mode of operation. In the half-duplex mode of operation, the selection module 206 may operate in a transmit mode of operation to present the presented communications signal 252 to the communications channel 104. Alternatively, the selection module 206 may operate in a receive mode of operation to observe the observed communications signal 256 from the communications channel 104. In an exemplary embodiment, the selection module 206 includes a switch to select from among the transmit mode of operation and the receive mode of operation. Alternatively, the selection module 206 may be configured to operate in the full-duplex mode of operation. In the full-duplex mode of operation, the selection module 206 may simultaneously operate in the transmit mode of operation and the receive mode of operation.

One or more of the communications transmitter 202, the communications receiver 204, and the selection module 206 may be implemented on a common chip or die. Alternatively, the one or more of the communications transmitter 202, the communications receiver 204, and the selection module 206 may be each implemented on a single chip or die. The common chips or dies and/or the single chips or dies may be connected together using bond wires and/or any other suitable means that will be apparent to those skilled in the relevant art(s) to form a part of the communications transceiver 200.

First Embodiment of a Communications Receiver

Figure 3:
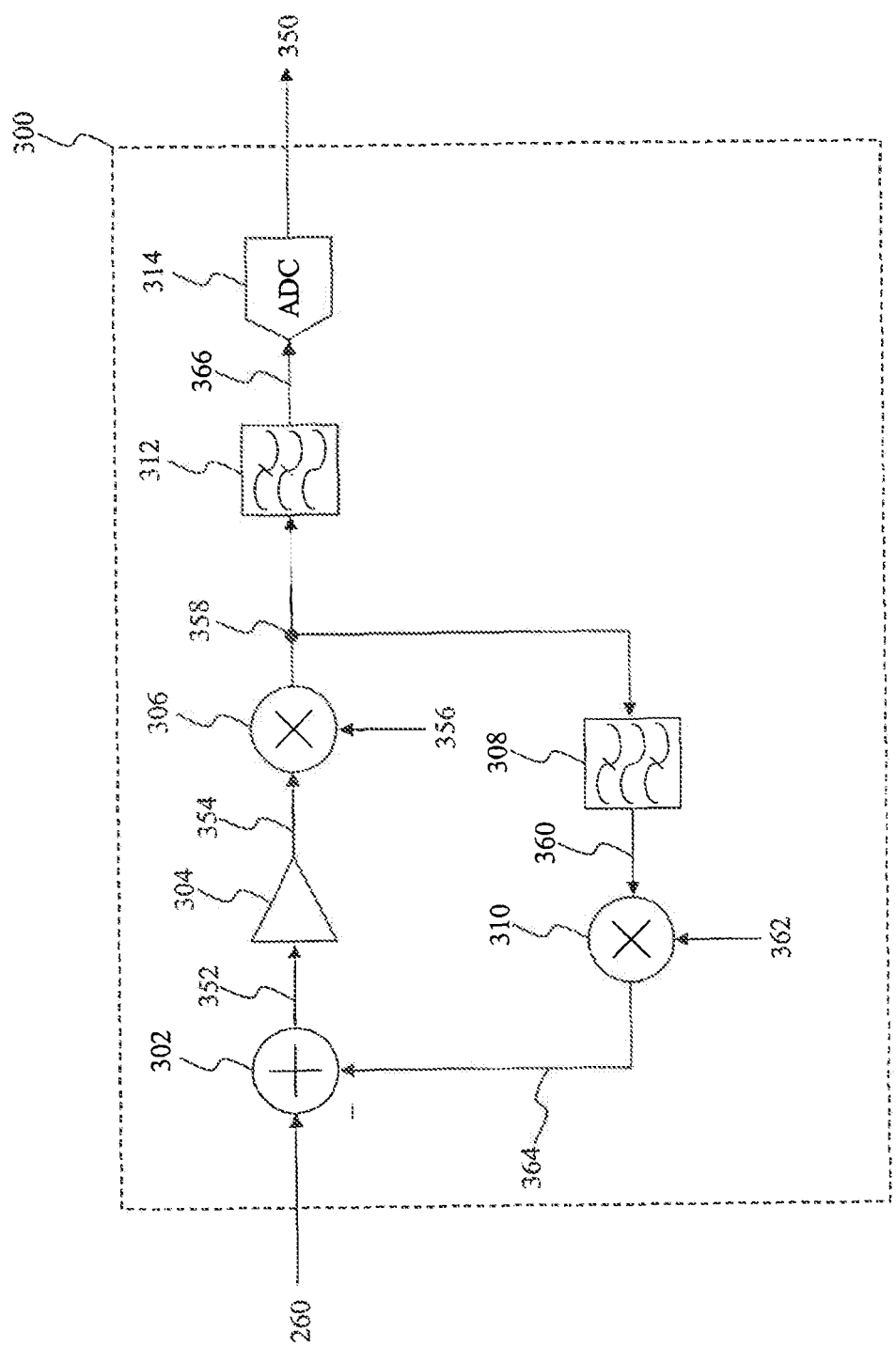
FIG. 3 illustrates a first block diagram of a communications receiver used in the communications transceiver according to a first exemplary embodiment of the present invention.

FIG. 3 illustrates a first block diagram of a communications receiver used in the communications transceiver according to a first exemplary embodiment of the present invention. A communications receiver 300 provides a digital recovered information signal 350 based upon a received communications signal 260. The communications receiver 300 may represent an exemplary embodiment of communications receiver 204. The communications receiver 300 includes a combination module 302, an amplifier module 304, a downconversion mixer 306, a first filter module 308, an upconversion mixer 310, a second filter module 312, and an analog to digital converter (ADC) 314.

The combination module 302 combines the received communications signal 260 and an upconverted replica noise signal 364, to be discussed in further detail below, to provide a noise reduced communications signal 352. The received communications signal 260 includes a desired communications signal and out of band interference, the out of band interference occupying a spectrum of frequencies that is exclusive from a spectrum of frequencies occupied by the desired communications signal. In other words, the out of band interference may be located outside, that is less than and/or greater than, a spectrum of frequencies occupied by the desired communications signal, commonly referred to as a bandwidth of the desired communications signal. The combination module 302, in effect, substantially reduces the out of band interference embedded within the received communications signal 260 by subtracting the upconverted replica noise signal 364 from the received communications signal 260 to provide the noise reduced communications signal 352.

The amplifier module 304 amplifies the noise reduced communications signal 352 to provide an amplified communications signal 354. More specifically, the amplifier module 304 amplifies the noise reduced communications signal 352 by a gain $G_1$ to provide the amplified communications signal 354. In an exemplary embodiment, the amplifier module 304 is implemented using a low noise amplifier (LNA).

The downconversion mixer 306 downconverts the amplified communications signal 354 using a first local oscillator signal 356 to provide a recovered communications signal 358. The recovered communications signal 358 includes the desired communications signal and the out of band interference, each of which has been frequency translated by the first local oscillator signal 356. The downconversion mixer 306 may downconvert or frequency translate the amplified communications signal 354 directly to approximately zero Hertz, referred to as DC or baseband, or to an intermediate frequency (IF) that is greater than DC to provide the recovered communications signal 358.

The first filter module 308 filters the recovered communications signal 358 to provide a replica noise signal 360, the replica noise signal 360 being proportional to the out of band interference embedded within recovered communications signal 358. More specifically, the first filter module 308 may implement a high pass filtering topology to filter out or remove the desired communications signal embedded within the recovered communications signal 358, leaving only the out of band interference embedded within the recovered communications signal 358 as the replica noise signal 360. Alternatively, in addition to removing the desired communications signal embedded within the recovered communications signal 358, the first filter module 308 may implement a bandpass filtering topology to additionally filter out any higher ordered mixing products, such as any sum and/or difference products to provide some examples, embedded within the recovered communications signal 358. These higher ordered mixing products represent undesirable mixing products resulting from the frequency translation of the amplified communications signal 354 by the downconversion mixer 306.

The upconversion mixer 310 upconverts the replica noise signal 360 using a second local oscillator signal 362 to provide the upconverted replica noise signal 364. The upconversion mixer 310 may upconvert or frequency translate the replica noise signal 360 to a frequency of the second local oscillator signal 362. In an exemplary embodiment, the frequency of the second local oscillator signal 362 is substantially similar to a frequency of the first local oscillator signal 356. In another exemplary embodiment, the frequency of the second local oscillator signal 362 is substantially similar to a frequency of the first local oscillator signal 356 but offset in phase from each other. The offset in phase between the first local oscillator signal 356 and the second local oscillator signal 362 ensures that the out of band interference embedded within the received communications signal 260 and the upconverted replica noise signal 364 are substantially aligned in phase. For example, in this exemplary embodiment, the frequency of the first local oscillator signal 356 may be represented as:

$$\cos(\omega_{LO}t), \qquad (3)$$

and the second local oscillator signal 362 may be represented as:

$$\cos(\omega_{LO}t+\phi), \qquad (4)$$

where $\phi$ represents a phase offset between the first local oscillator signal 356 and the second local oscillator signal 362. In an additional exemplary embodiment, the phase offset $\phi$ may be substantially similar to a group delay of the first filter module 308. Alternatively, the phase offset $\phi$ may represent as programmable phase offset between $\phi$ and $2\pi$, such as $$\frac{n\pi}{2},$$

where n represents 1, 2, 3, or 4, to provide an example. However, these examples are not limiting, those skilled in the relevant art(s) may use any suitable phase offset $\phi$ to substantially align the out of band interference embedded within the received communications signal 260 and the upconverted replica noise signal 364 in phase without departing from the spirit and scope of the present invention.

The second filter module 312 filters the recovered communications signal 358 to provide a recovered information signal 366. The second filter module 312 may implement a low pass filtering topology to filter out or remove the out of band interference embedded within the recovered communications signal 358 leaving only the desired communications signal embedded within the recovered communications signal 358 as the recovered information signal 366.

The analog to digital converter (ADC) 314 converts the recovered information signal 366 from an analog representation to a digital representation to provide the digital recovered information signal 350. The digital recovered information signal 350 may be provided to a digital signal processing device (not shown in FIG. 3) to further process the digital recovered information signal 350 to provide the recovered information signal 254. Alternatively, the ADC 314 may directly provide the provide the digital recovered information signal 350 as the recovered information signal 254.

Filter Module Used in the Communications Receiver

FIG. 9 illustrates a block diagram of a filter module used in the communications receiver according to an exemplary embodiment of the present invention. In this exemplary embodiment, the first filter module 308 may implement a bandpass filtering topology to filter out or remove the desired communications signal and any higher ordered mixing products, such as any sum and/or difference products to provide some examples, embedded within the recovered communications signal 358. However, this example is not limiting, those skilled in the relevant art(s) may implement the first filter module 308 using any other suitable filter topology, such as low pass, high pass, and band stop to provide some examples, differentially in accordance with the teachings herein without departing from the spirit and scope of the present invention.

The filter module 308 includes a high pass stage 902 and a low pass stage 904. The high pass stage 902 removes the desired communications signal embedded within the recovered communications signal 358 using a series capacitor $C_1$ coupled to a shunt resistor $R_1$. The low pass stage 904 removes the higher ordered mixing products embedded within the recovered communications signal 358 using includes a series resistor $R_2$ coupled to a shunt capacitor $C_2$.

Frequency Translation of the Filter Module

The frequency translation of the amplified communications signal 354 by the downconversion mixer 306, the filtering of the recovered communications signal 358 by the first filter module 308, and the subsequent frequency translation of the replica noise signal 360 by the upconversion mixer 310, in effect, frequency translates a frequency response, as indicated by determined by a transfer function, of the first filter module 308 from the baseband or the IF frequencies to the frequency of the second local oscillator signal 362.

FIG. 4 graphically illustrates a frequency translation of a filter module used in the communications receiver according to an exemplary embodiment of the present invention. The filter module 308 may be characterized by its respective resonant frequency (or center frequency) and its 3 decibel (dB) frequency bandwidth. The quality factor (Q) the first filter module 308 is the ratio of its resonant frequency (or center frequency) to its 3 decibel (dB) frequency bandwidth. As shown in spectrum graph 402, at the baseband or the IF frequencies, the resonant frequency and the 3 dB frequency bandwidth, denoted as a difference between of the first filter module 308 are both low, such in the order of Megahertz (MHz) or Kilohertz (KHz) to provide some examples, resulting in a low Q filter at these frequencies. The Q factor of the first filter module 308 at the baseband or the IF frequencies may be denoted as:

$$\frac{f_{RX}}{f_H - f_L}, \qquad (5)$$

where $f_{RX}$ represents the resonant frequency of the first filter module 308 and $f_H - f_L$ represents the 3 dB frequency bandwidth of the first filter module 308.

As shown in spectrum graph 404, the subsequent frequency translation of the replica noise signal 360 by the upconversion mixer 310, in effect, frequency translates the first filter module 308 from being a low Q filter at the baseband or the IF frequencies to a high Q filter at the frequency of the second local oscillator signal 362. The Q factor of the first filter module 308 at the frequency of the second local oscillator signal 362 may be denoted as:

$$\frac{f_{LO}}{f_H - f_L}, \qquad (6)$$

where $f_{LO}$ represents the frequency of the second local oscillator signal 362 and $f_H - f_L$ represents the 3 dB frequency bandwidth of the first filter module 308 at baseband. The resonant frequency of the first filter module 308 is translated from a low resonant frequency to a high resonant frequency, such as in the order Gigahertz (GHz) to provide an example, resulting in a higher Q filter. The 3 dB frequency bandwidth of the first filter module 308 remains, however, unchanged at the frequency of the second local oscillator signal 362. In other words, the 3 dB frequency bandwidth of the first filter module 308 is maintained at baseband at the frequency of the second local oscillator signal 362. As a result, the effective ratio of its resonant frequency to its 3 decibel frequency bandwidth, or the Q factor, effectively increases when compared to the Q factor at the baseband or the IF frequencies.

Although the frequency translation of the frequency response of the first filter module 308 is described in terms of a bandpass filter in FIG. 4, those skilled in the relevant art(s) may similarly frequency translate any other filter topology, such as low pass, high pass, and band stop to provide some examples, in a substantially similar manner accordance with the teachings herein without departing from the spirit and scope of the present invention.

Second Embodiment of the Communications Receiver

Quadrature modulating entails modulating an information signal, such as the first information signal 150 and/or the second information signal 158 to provide some examples, with two carrier waves that are substantially similar in frequency but exhibit a 90-degree phase offset from one another. The information signal is substantially simultaneously modulated with a first carrier wave to provide an in-phase (I) signal and a second carrier to provide a quadrature phase (Q) signal. The I signal and Q signal are then combined to provide a transmitted communication signal, such as the first transmitted communications signal 152 and/or the second transmitted communications signal 160 to provide some examples.

FIG. 5 illustrates a second block diagram of a communications receiver used in the communications transceiver according to a second exemplary embodiment of the present invention. A communications receiver 500 provides an in-phase digital recovered information signal 350a and a quadrature phase digital recovered information signal 350b based upon the received communications signal 260. The received communications signal 260 may be modulated and/or encoded using a quadrature scheme, such as phase-shift keying (PSK), or quadrature amplitude modulation (QAM) to provide some examples. The communications receiver 500 may represent an exemplary embodiment of communications receiver 204. The communications receiver 500 includes the first combination module 302, the amplifier module 304, the downconversion mixer 306, the first filter module 308, the upconversion mixer 310, the second filter module 312, the ADC 314, and a second combination module 502. The communications receiver 500 operates in a substantially similar manner as the communications receiver 300. Therefore, only differences between the communications receiver 300 and the communications receiver 500 will be further described in detail.

The downconversion mixer 306 includes an in-phase downconversion mixer 306a and a quadrature phase downconversion mixer 306b. The in-phase downconversion mixer 306a downconverts the amplified communications signal 354 using an in-phase first local oscillator signal 356a to provide an in-phase recovered communications signal 358a. The second downconversion mixer 306b downconverts the amplified communications signal 354 using a quadrature phase first local oscillator signal 356b to provide a quadrature phase recovered communications signal 358b. The in-phase downconversion mixer 306a and the quadrature phase downconversion mixer 306b operate in a substantially similar manner as the downconversion mixer 306 as described above. The in-phase first local oscillator signal 356a and the quadrature phase first local oscillator signal 356b are substantially similar in frequency but offset in phase by 90-degrees.

The first filter module 308 includes an in-phase first filter module 308a and a quadrature phase first filter module 308b. The in-phase first filter module 308a filters the in-phase recovered communications signal 358a to provide an in-phase replica noise signal 360a, the in-phase replica noise signal 360a being proportional to the out of band interference embedded within the in-phase recovered communications signal 358a. The quadrature phase first filter module 308b filters the quadrature phase recovered communications signal 358b to provide a quadrature phase replica noise signal 360b, the quadrature phase replica noise signal 360b being proportional to the out of band interference embedded within the quadrature phase recovered communications signal 358b. The in-phase first filter module 308a and the quadrature phase first filter module 308b operate in a substantially similar manner as the first filter module 308 as described above.

The upconversion mixer 310 includes an in-phase upconversion mixer 310a and a quadrature phase upconversion mixer 310b. The in-phase upconversion mixer 310a upconverts the in-phase replica noise signal 360a using an in-phase second local oscillator signal 362a to provide an in-phase upconverted replica noise signal 550a. The quadrature phase upconversion mixer 310b upconverts the quadrature phase replica noise signal 360b using a quadrature phase second local oscillator signal 362b to provide the quadrature phase upconverted replica noise signal 550b. The in-phase upconversion mixer 310a and the quadrature phase upconversion mixer 310b operate in a substantially similar manner as the upconversion mixer 310 as described above. The in-phase second local oscillator signal 362a and the quadrature phase second local oscillator signal 362b are substantially similar in frequency but offset in phase by 90-degrees.

The second combination module 502 combines the in-phase upconverted replica noise signal 550a and the quadrature phase upconverted replica noise signal 550a to provide the upconverted replica noise signal 364.

The second filter module 312 includes an in-phase second filter module 312a and a quadrature phase second filter module 312b. The in-phase second filter module 312a filters the in-phase recovered communications signal 358a to provide an in-phase recovered information signal 366a. The quadrature phase second filter module 312b filters the quadrature phase recovered communications signal 358b to provide a quadrature phase recovered information signal 366b. The in-phase second filter module 312a and the quadrature phase second filter module 312b operate in a substantially similar manner as the second filter module 312 as described above.

The ADC 314 includes an in-phase ADC 314a and a quadrature phase ADC 314b. The in-phase ADC 314a converts the in-phase recovered information signal 366a from an analog representation to a digital representation to provide the in-phase digital recovered information signal 350a. The quadrature phase ADC 314b converts the quadrature phase recovered information signal 366b from an analog representation to a digital representation to provide the quadrature phase digital recovered information signal 350b. The in-phase ADC 314a and the quadrature phase ADC 314b operate in a substantially similar manner as the ADC 314 as described above.

Third Embodiment of the Communications Receiver

FIG. 6A illustrates a third block diagram of a communications receiver used in the communications transceiver according to a third exemplary embodiment of the present invention. A communications receiver 600 provides a digital recovered information signal 350 based upon a received communications signal 260. The communications receiver 600 may represent an exemplary embodiment of communications receiver 204. The communications receiver 600 includes the combination module 302, the amplifier module 304, the downconversion mixer 306, the first filter module 308, the upconversion mixer 310, the second filter module 312, the ADC 314, and a second amplifier module 602. The communications receiver 600 operates in a substantially similar manner as the communications receiver 300. Therefore, only differences between the communications receiver 300 and the communications receiver 500 will be further described in detail.

The second amplifier module 602 amplifies the recovered communications signal 358 to provide an amplified recovered communications signal 650. The first filter module 308 and the second filter module 312 may filter the amplified recovered communications signal 650 to provide the replica noise signal 360 and the recovered information signal 366, respectively. In an exemplary embodiment, the second amplifier module 602 is implemented as a buffering amplifier having a gain of approximately one. In this exemplary embodiment, the second amplifier module 602 substantially reduces reflections from the first filter module 308 and/or the second filter module 312 from substantially degrading the performance of the downconversion mixer 306.

Fourth Embodiment of the Communications Receiver

It should be noted that the communications receiver 500 may also be modified in a substantially similar manner. FIG. 6B illustrates a fourth block diagram of a communications receiver used in the communications transceiver according to a fourth exemplary embodiment of the present invention.

A communications receiver 620 provides a digital recovered information signal 350 based upon a received communications signal 260. The communications receiver 600 may represent an exemplary embodiment of communications receiver 204. The communications receiver 600 includes the combination module 302, the amplifier module 304, the downconversion mixer 306, the first filter module 308, the upconversion mixer 310, the second filter module 312, the ADC 314, and a second amplifier module 602. The communications receiver 620 operates in a substantially similar manner as the communications receiver 500. Therefore, only differences between the communications receiver 500 and the communications receiver 620 will be further described in detail.

An in-phase second amplifier module 602a provides an in-phase amplified recovered communications signal 650a and a quadrature phase second amplifier module 602b to provide a quadrature phase amplified recovered communications signal 650b. The in-phase first filter module 308a and the in-phase second filter module 312a may then filter the in-phase amplified recovered communications signal 650a to provide the in-phase replica noise signal 360a and the in-phase recovered information signal 366a, respectively. Likewise, the quadrature phase first filter module 308b and the quadrature phase second filter module 312b may filter the quadrature phase amplified recovered communications signal 650b to provide the quadrature phase replica noise signal 360b and the quadrature phase recovered information signal 366b, respectively.

Fifth Embodiment of the Communications Receiver

FIG. 7 illustrates a fifth block diagram of a communications receiver used in the communications transceiver according to a fifth exemplary embodiment of the present invention. A communications receiver 700 provides a digital recovered information signal 350 based upon a received communications signal 260. The communications receiver 700 may represent an exemplary embodiment of communications receiver 204. The communications receiver 700 includes the combination module 302, the amplifier module 304, the downconversion mixer 306, the first filter module 308, the upconversion mixer 310, the second filter module 312, the ADC 314, and a second amplifier module 702. The communications receiver 700 operates in a substantially similar manner as the communications receiver 300. Therefore, only differences between the communications receiver 300 and the communications receiver 500 will be further described in detail.

The second amplifier module 702 amplifies the received communications signal 260 by a gain $G_2$ to provide an amplified received communications signal 752. The second amplifier module 702 amplifies the received communications signal 260 by the gain $G_2$ to provide an amplified received communications signal 752. The gain $G_2$ is selected such that the amplification of the out of band interference embedded within the received communications signal 260 does not cause the second amplifier module 702 to compress.

The out of band interference embedded within the received communications signal 260 may be substantially reduced by combining the amplified received communications signal 752 and the upconverted replica noise signal 364. However, this combing introduces additional undesirable interference and/or distortion resulting from the downconversion mixer 306, the first filter module 308, and/or the upconversion mixer 310 into the noise reduced communications signal 352. By dividing the overall gain of the communications receiver 700 into the gain $G_1$ and the gain $G_2$, the gain $G_1$ of the amplifier module 304 of the communications receiver 700 may be reduced from the gain $G_1$ of the amplifier module 304 used in the communications receiver 300, thereby reducing the amplification of the additional undesirable interference and/or distortion.

It should be noted that the communications receiver 500 and the communications receiver 600 may be modified in a substantially similar manner to include a second amplifier module 702.

FIG. 8 illustrates a block diagram of an amplifier module used in the communications receiver according to an exemplary embodiment of the present invention. An amplifier module 800 amplifies a first communications signal 850 by a gain $G_1$ using a first amplifier module 802 to provide an amplified first communications signal 852. The first amplifier module 802 may represent an exemplary embodiment of the second amplifier module 702. Likewise, the first communications signal 850 and the amplified first communications signal 852 may represent exemplary embodiments of the received communications signal 260 and the amplified received communications signal 752, respectively. The first amplifier module 802 includes an n-type metal oxide silicon (NMOS) transistor $M_1$ and an inductor $L_1$ configured and arranged to operate as a common source transistor amplifier.

The amplifier module 800 combines the first communications signal 850 with a second communications signal 854 using a combination module 804 to provide a noise-reduced communications signal 856. The combination module 804 may represent an exemplary embodiment of the combination module 302. Likewise, the second communications signal 854 and the noise-reduced communications signal 856 may represent exemplary embodiments of upconverted replica noise signal 364 and the noise reduced communications signal 352, respectively. The combination module 804 is implemented as a simple circuit node.

The amplifier module 800 amplifies noise-reduced communications signal 856 by a gain $G_2$ using a second amplifier module 806 to provide a noise-reduced communications signal 858. The second amplifier module 806 may represent an exemplary embodiment of the amplifier module 304. Likewise, the noise-reduced communications signal 858 may represent an exemplary embodiment of the amplified communications signal 354. The second amplifier module 806 includes an n-type metal oxide silicon (NMOS) transistor $M_2$ configured and arranged to operate as a common-source amplifier based upon an external bias 860.

It should be noted that the common-source implementation of the first amplifier module 802 and/or the second amplifier module 806 represents one exemplary configuration. Those skilled in the relevant art(s) may implement the first amplifier module 802 and/or the second amplifier module 806 differently in accordance with the teachings herein without departing from the scope and spirit of the present invention.

Operational Control Flow of the Communications Receiver

FIG. 10 is a flowchart 1000 of exemplary operational steps of the communications receiver used in the communications transceiver according to an exemplary embodiment of the present invention. The invention is not limited to this operational description. Rather, it will be apparent to persons skilled in the relevant art(s) from the teachings herein that other operational control flows are within the scope and spirit of the present invention. The following discussion describes the steps in FIG. 10.

At step 1002, the operational control flow amplifies a received communication signal from a communication channel, such as the communications channel 104, using one or more antennas, one or more copper cables, and/or one or more fiber optic cables. The received communication signal includes a desired communications signal and out of band interference, the out of band interference occupying a spectrum of frequencies that is exclusive from a spectrum of frequencies occupied by the desired communications signal. The operational control flow amplifies the received communication signal using a first amplifier module, such as the amplifier module 702 to provide an example, having a gain $G_1$. In an exemplary embodiment, step 1002 is optional. In this exemplary embodiment, the operational control flow begins at step 1004.

At step 1004, the operational control flow removes out-of-band interference from an amplified communications signal of step 1004. The operational control flow may use a combination module, such as the combination module 302 to provide an example, to subtract the out-of-band interference from the amplified communications signal of step 1004 to substantially reduce the out-of-band interference embedded within the amplified communications signal of step 1004.

At step 1006, the operational control flow amplifies a noise reduced communications signal from step 1004. The operational control flow amplifies the received communication signal using a second amplifier module, such as the amplifier module 304 to provide an example, having a gain $G_2$.

At step 1008, the operational control flow downconverts an amplified noise reduced communications signal from step 1006 to approximately zero Hertz, referred to as DC or baseband, or to an intermediate frequency (IF) that is greater than DC based upon a first local oscillator signal, such as the first local oscillator signal 356 to provide an example. The operational control flow may use a first mixer, such as the downconversion mixer 306 to provide an example, to downconvert the amplified noise reduced communications signal from step 1006.

At step 1010, the operational control flow replicates the out-of-band interference embedded within a recovered communication signal from step 1008. The operational control flow may use a first filter, such as the first filter module 308 to provide an example, to filter out or remove the desired communications signal embedded within the recovered communication signal from step 1008 leaving the out-of-band interference.

At step 1012, the operational control flow upconverts a replicated out-of-band interference from step 1010 based upon a second local oscillator signal, such as the second local oscillator signal 362 to provide an example. In an exemplary embodiment, a frequency of the second local oscillator signal is substantially similar to a frequency of the first local oscillator signal. In another exemplary embodiment, the frequency of the second local oscillator signal is substantially similar to a frequency of the first local oscillator signal but offset in phase from each other. The operational control flow may use a second mixer, such as the upconversion mixer 310 to provide an example, to upconvert replicated out-of-band interference from step 1010.

At step 1014, the operational control flow filters the recovered communication signal from step 1008. The operational control flow may use a second filter, such as the second filter module 312 to provide an example, to remove the out-of-band interference embedded within the recovered communication signal from step 1008 leaving only the desired communications signal.

At step 1016, the operational control flow converts the desired communication signal from step 1014 from an analog representation to a digital representation to provide the digital recovered information signal 350. The operational control flow may use an analog to digital converter, such as the ADC 314 to provide an example, to converts the desired communication signal from step 1014 to the digital representation.

CONCLUSION

It is to be appreciated that the Detailed Description section, and not the Abstract section, is intended to be used to interpret the claims. The Abstract section may set forth one or more, but not all exemplary embodiments, of the present invention, and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus, the present invention should not be limited by any of the above-described exemplary embodiments, but should be defined only in accordance with the following claims and their equivalents.

What is claimed is:

1. An apparatus, comprising:
a first mixer configured to frequency translate a first communications signal to a first frequency using a first local oscillator signal to provide a second communications signal;
a filter module configured to filter the second communications signal to provide a third communications signal; and
a second mixer configured to frequency translate the third communications signal to a second frequency using a second local oscillator signal to provide a fourth communications signal,
wherein the filter module is characterized by a first center frequency and a first frequency bandwidth corresponding to the first frequency, the second mixer being further configured to effectively frequency translate the first center frequency of the filter module to a second center frequency corresponding to the second frequency while maintaining the first frequency bandwidth.

2. The apparatus of claim 1, wherein the first frequency includes at least one selected from a group consisting of:

a baseband frequency of approximately zero Hertz; and
an intermediate frequency (IF), the IF being greater than the baseband frequency.

3. The apparatus of claim 1, wherein the filter module is further characterized by a first quality factor corresponding to the first frequency, the second mixer effectively translating a characterization of the filter module from the first quality factor to a second quality factor corresponding to the second frequency, the second quality factor being greater than the first quality factor.

4. The apparatus of claim 3, wherein the first quality factor represents a ratio of the first center frequency to the first frequency bandwidth and the second quality factor represents a ratio of the second center frequency to the first frequency bandwidth.

5. The apparatus of claim 1, wherein the filter module is implemented as a band pass filter.

6. The apparatus of claim 1, further comprising:
an amplifier module, coupled between the first mixer and the filter module, configured to amplify the second communications signal to provide a fifth communications signal, wherein the filter module is configured to filter the fifth communications signal to provide the third communications signal.

7. The apparatus of claim 1, wherein the first local oscillator signal and the second local oscillator signal are offset in phase from each other.

8. The apparatus of claim 7, wherein the first local oscillator signal and the second local oscillator signal are offset in phase by approximately a group delay of the filter module.

9. The apparatus of claim 1, wherein a frequency of the second local oscillator signal is substantially similar to a frequency of the first local oscillator signal, and
wherein the second center frequency is greater than the first center frequency.

10. An apparatus for reducing noise in a received communications signal, comprising:
a combination module configured to combine the received communications signal and an upconverted replica noise signal to provide a noise reduced communications signal;
a first mixer configured to frequency translate the noise reduced communications signal to a first frequency using a first local oscillator signal to provide a recovered communications signal;
a filter module configured to filter the recovered communications signal to provide a replica noise signal; and
a second mixer configured to frequency translate the replica noise signal to a second frequency using a second local oscillator signal to provide the upconverted replica noise signal,
wherein the filter module is characterized by a first center frequency and a first frequency bandwidth corresponding to the first frequency, the second mixer being configured to effectively frequency translate the first center frequency of the filter module to a second center frequency corresponding to the second frequency while maintaining the first frequency bandwidth.

11. The apparatus of claim 10, further comprising:
a first amplifier module, having a first gain, configured to amplify the noise reduced communications signal to provide a first amplified communications signal; and
a second amplifier module, having a second gain, configured to amplify the first amplified communications signal to provide a second amplified communications signal,
wherein the first mixer is configured to frequency translate the second amplified communications signal.

12. The apparatus of claim 10, wherein the first frequency includes at least one selected from a group consisting of:
   a baseband frequency of approximately zero Hertz; and
   an intermediate frequency (IF), the IF being greater than the baseband frequency.

13. The apparatus of claim 10, wherein the filter module is further characterized by a first quality factor corresponding to the first frequency, the second mixer effectively translating a characterization of the filter module from the first quality factor to a second quality factor corresponding to the second frequency, the second quality factor being greater than the first quality factor,
   wherein the first local oscillator signal and the second local oscillator signal are offset in phase from each other, and
   wherein the second center frequency is greater than the first center frequency.

14. The apparatus of claim 10, wherein the received communications signal includes a desired communications signal and out of band interference, and
   wherein the filter module is implemented as a band pass filter, the filter module being configured to remove the desired communications signal embedded within the recovered communications signal leaving the out of band interference embedded within the recovered communications signal as the replica noise signal.

15. The apparatus of claim 10, further comprising:
   a second filter module configured to filter the recovered communications signal to provide a recovered information signal; and
   an analog to digital converter (ADC) configured to convert the recovered information signal from an analog representation to a digital representation to provide a digital recovered information signal.

16. An apparatus for reducing noise in a received communications signal, comprising:
   a first combination module configured to combine an in-phase upconverted replica noise signal and a quadrature phase upconverted replica noise signal to provide a combined upconverted replica noise signal;
   a second combination module configured to combine the received communications signal and the combined upconverted replica noise signal to provide a noise reduced communications signal;
   a first in-phase mixer configured to frequency translate the noise reduced communications signal to a first frequency using a first in-phase local oscillator signal to provide an in-phase recovered communications signal;
   a first quadrature phase mixer configured to frequency translate the noise reduced communications signal to the first frequency using a first quadrature phase local oscillator signal to provide a quadrature phase recovered communications signal;
   an in-phase filter module configured to filter the in-phase recovered communications signal, to provide an in-phase replica noise signal;
   a quadrature phase filter module configured to filter the quadrature phase recovered communications signal to provide a quadrature phase replica noise signal;
   a second in-phase mixer configured to frequency translate the in-phase replica noise signal to a second frequency using a second in-phase local oscillator signal to provide an in-phase upconverted replica noise signal; and
   a second quadrature phase mixer configured to frequency translate the quadrature phase replica noise signal to the second frequency using a second quadrature phase local oscillator signal to provide a quadrature phase upconverted replica noise signal,
   wherein the in-phase filter module and the quadrature phase filter module are characterized by a first center frequency and a first frequency bandwidth corresponding to the first frequency, the second in-phase mixer being configured to effectively frequency translate the first center frequency of the in-phase filter module to a second center frequency corresponding to the second frequency while maintaining the first frequency bandwidth, and the second quadrature phase mixer being further configured to effectively frequency translate the first center frequency of the quadrature phase filter module to the second center frequency corresponding to the second frequency while maintaining the first frequency bandwidth.

17. The apparatus of claim 16, further comprising:
   an amplifier module configured to amplify the noise reduced communications signal to provide an amplified communications signal,
   wherein the first in-phase mixer and the first quadrature phase mixer are each configured to frequency translate the amplified communications signal.

18. The apparatus of claim 16, wherein the first frequency includes at least one selected from a group consisting of:
   a baseband frequency of approximately zero Hertz; and
   an intermediate frequency (IF), the IF being greater than the baseband frequency.

19. The apparatus of claim 16, wherein the in-phase filter module and the quadrature phase filter module are each further characterized by a first quality factor corresponding to the first frequency,
   wherein the second in-phase mixer effectively translates a characterization of the in-phase filter module from the first quality factor to a second quality factor corresponding to the second frequency, the second quality factor being greater than the first quality factor, and
   wherein the second quadrature phase mixer effectively translates a characterization of the quadrature phase filter module from the first quality factor to the second quality factor corresponding to the second frequency, the second quality factor being greater than the first quality factor.

20. The apparatus of claim 16, wherein the first in-phase local oscillator signal and the second in-phase local oscillator signal are offset in phase from each other,
   wherein the first quadrature phase local oscillator signal and the second quadrature phase local oscillator signal are offset in phase from each other, and
   wherein the second center frequency is greater than the first center frequency.

* * * * *

UNITED STATES PATENT AND TRADEMARK OFFICE
CERTIFICATE OF CORRECTION

| | |
|---|---|
| PATENT NO. | : 8,644,786 B2 |
| APPLICATION NO. | : 13/613624 |
| DATED | : February 4, 2014 |
| INVENTOR(S) | : Mirzaei et al. |

Page 1 of 1

It is certified that error appears in the above-identified patent and that said Letters Patent is hereby corrected as shown below:

In the Claims:

Column 17
Line 55, replace "signal, to" with --signal to--

Signed and Sealed this
Twentieth Day of May, 2014

Michelle K. Lee
*Deputy Director of the United States Patent and Trademark Office*